J. M. SHAY.
PICTURE SCREEN.
APPLICATION FILED MAY 7, 1919.

1,347,761.

Patented July 27, 1920.

INVENTOR
James M. Shay
BY
J. W. Ellis
ATTORNEY

UNITED STATES PATENT OFFICE.

JAMES M. SHAY, OF BUFFALO, NEW YORK, ASSIGNOR, BY DIRECT AND MESNE ASSIGNMENTS, TO STEEL VELOUR SCREEN CORPORATION, OF BUFFALO, NEW YORK, A CORPORATION OF NEW YORK.

PICTURE-SCREEN.

1,347,761.     Specification of Letters Patent.     Patented July 27, 1920.

Application filed May 7, 1919. Serial No. 295,343.

*To all whom it may concern:*

Be it known that I, JAMES M. SHAY, a citizen of the United States of America, residing in the city of Buffalo, county of Erie, and State of New York, have invented certain new and useful Improvements in Picture-Screens, of which the following is a full, clear, and exact description.

My invention relates generally to picture screens and methods of treating them, and in particular to screens used to display motion pictures.

The principal object of my invention has been to provide a screen with a surface which absorbs all of the glare, whereby the screen will be relieved of its dazzling effect upon the eyes.

Another object has been to provide a process of treating whereby the resulting screen will be provided with a plurality of minute indentations on its surface.

Furthermore, by means of my method of treating, a screen is provided which is very durable and serviceable and one which need not be retreated but may easily be cleaned with soap and water.

The above objects and advantages have been accomplished by the screen shown in the accompanying drawings and by the method of treating the same as hereinafter set forth.

Figure 1:
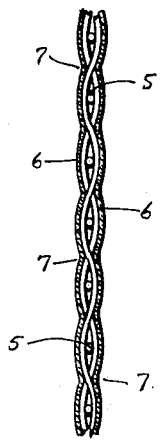
Figure 1 is a fragmentary sectional view of my screen.
Figure 2:
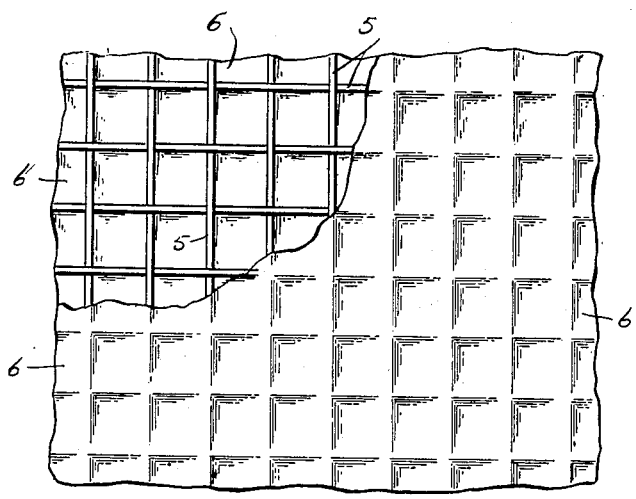
Fig. 2 is a fragmentary view of the screen with a portion thereof broken away.

In the accompanying drawings, I have shown a screen constructed after my invention and a structure by which my process may be carried out, it being obvious that the method of treating is applicable and the results may be accomplished by other constructions of screens than that shown in the drawings.

In the screen shown in the drawings 5 represents the body of my screen formed preferably of wire mesh. On each side of the wire mesh 5 is disposed a sheet of canvas 6. The canvas is secured to the wire mesh by means of the materials used to treat the finished screen and the canvas is pressed and held into contact with the wire mesh. The canvas clings so closely to the wire mesh that there are formed a large number of slight indentations 7 in the interstices between the strands of the wire mesh. These indentations relieve the objectionable glare and reflection which are present in the ordinary screen with a flat surface. For convenience in the claims and description I have called the surface upon which the pictures are projected the receiving surface.

In preparing my screen the sheets of canvas 6 are treated first with a coat of banana oil, then with a coat of boiled linseed oil, and then with a coat of varnish sizing. The wire mesh 5 is then treated with a coat of water-glass and afterward with a coat of velour white paint, composed preferably of equal parts of velour paint and linseed oil. The sheets of canvas are then placed in contact with the wire mesh and the canvas is then treated with a coat of water-glass, after which it is treated with a coat of velour flat white paint, which is followed by another coat of water-glass. After my screen has been thus treated it is given three coats of velour flat white paint, each coat being placed upon the screen after the previous coat has been thoroughly dried.

While I have shown and described the body of my screen as being preferably formed of a wire mesh, yet it is to be understood that any material, providing a series of spaces, which, when covered by the canvas, will form a series of indentations or a wave like surface in the canvas after it has been applied to the body, could be used instead of the wire mesh. Thus a perforated or a corrugated body might be advantageously used instead of the wire mesh. It is to be understood that these and other modifications may be made without departing from the spirit of my invention or the scope of the appended claims.

Having thus described my invention, what I claim is:

1. A picture screen comprising a body provided with interstices, a sheet of fabric pressed into contact with the body so closely that there are formed on the surface of the fabric slight depressions corresponding to the interstices of the body, and means uniting the body and the fabric together.

2. A picture screen comprising a body provided with interstices, a sheet of fabric at each side of the body and pressed into contact with the body so closely that there are formed on the surface of the fabric slight depressions corresponding to the interstices of the body, and means uniting the body and the fabric together, whereby the fabric is characterized by having a wave-like picture receiving surface.

3. A picture screen comprising a body formed of wire mesh, a sheet of fabric pressed into contact with the body so closely that there are formed on the surface of the fabric slight depressions corresponding to the interstices of the body, and means uniting the body and fabric together, whereby the fabric is characterized by having a wave-like picture receiving surface.

In witness whereof I have hereunto signed my name.

JAMES M. SHAY.